INVENTOR.
ROLF-DIETER NEUSER
BY
Woodhams, Blanchard & Flynn
ATTORNEYS

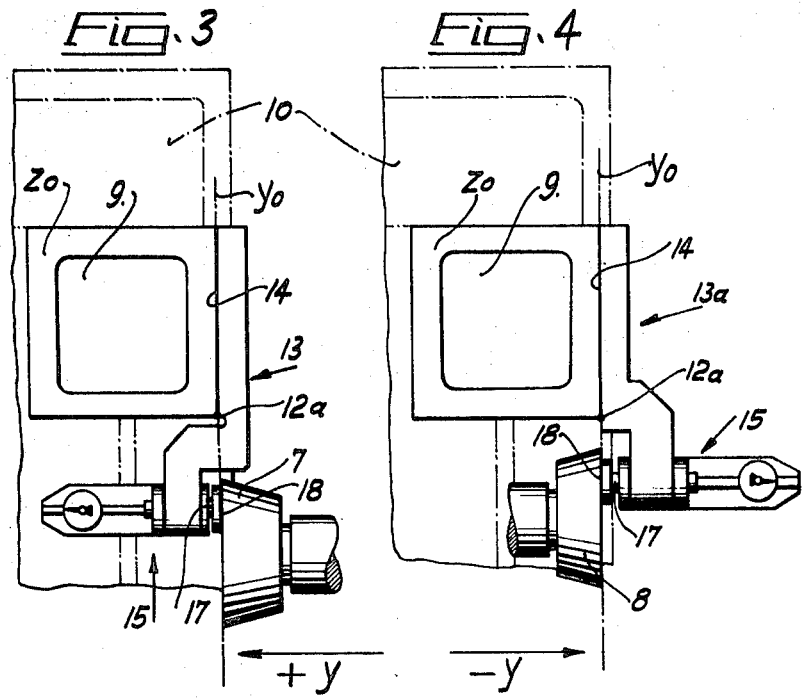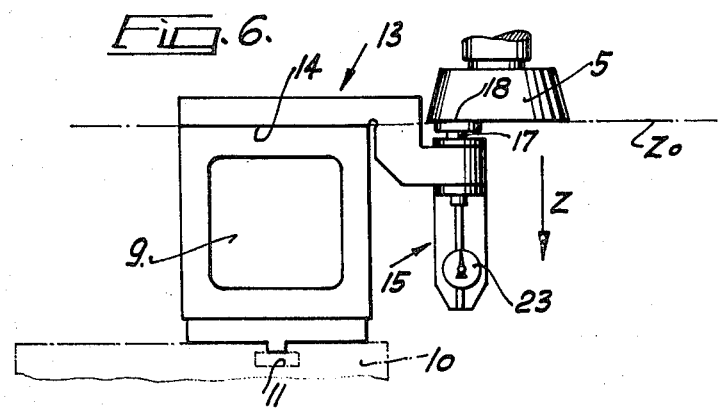

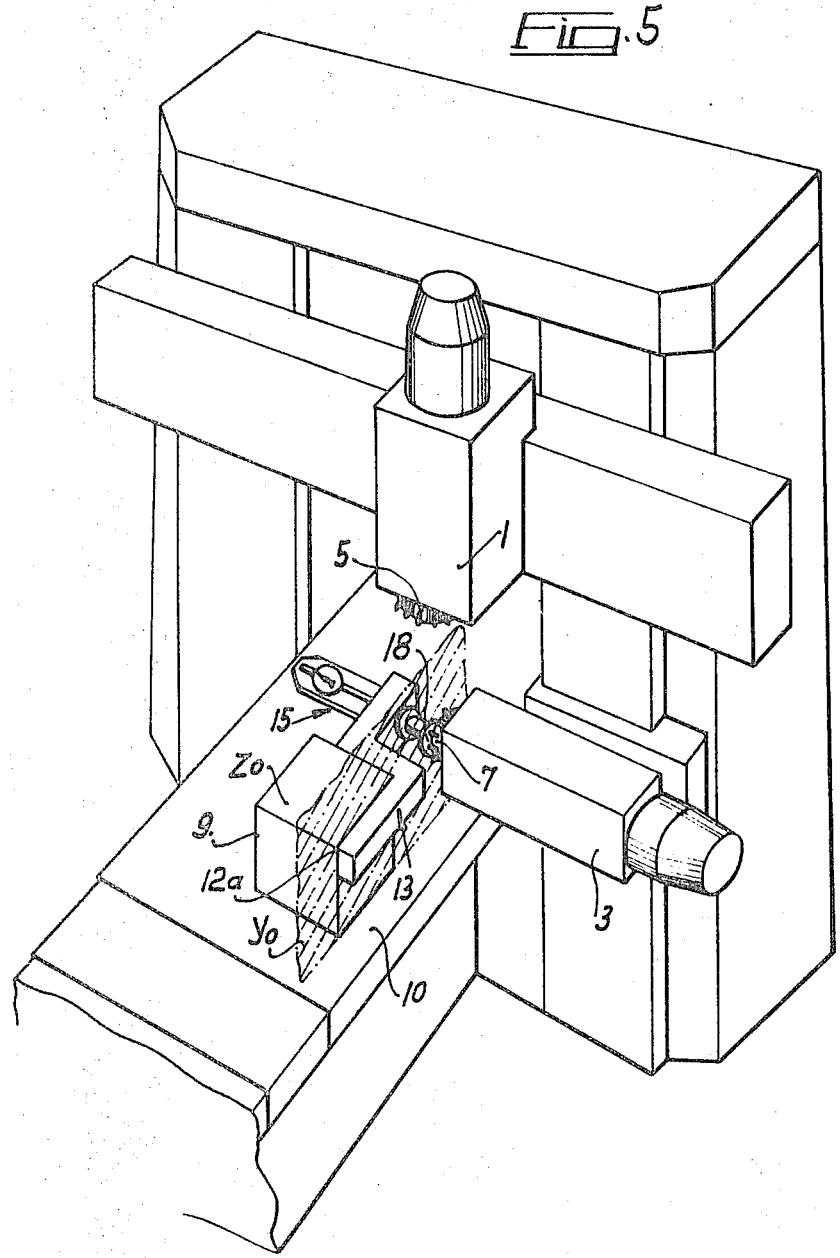

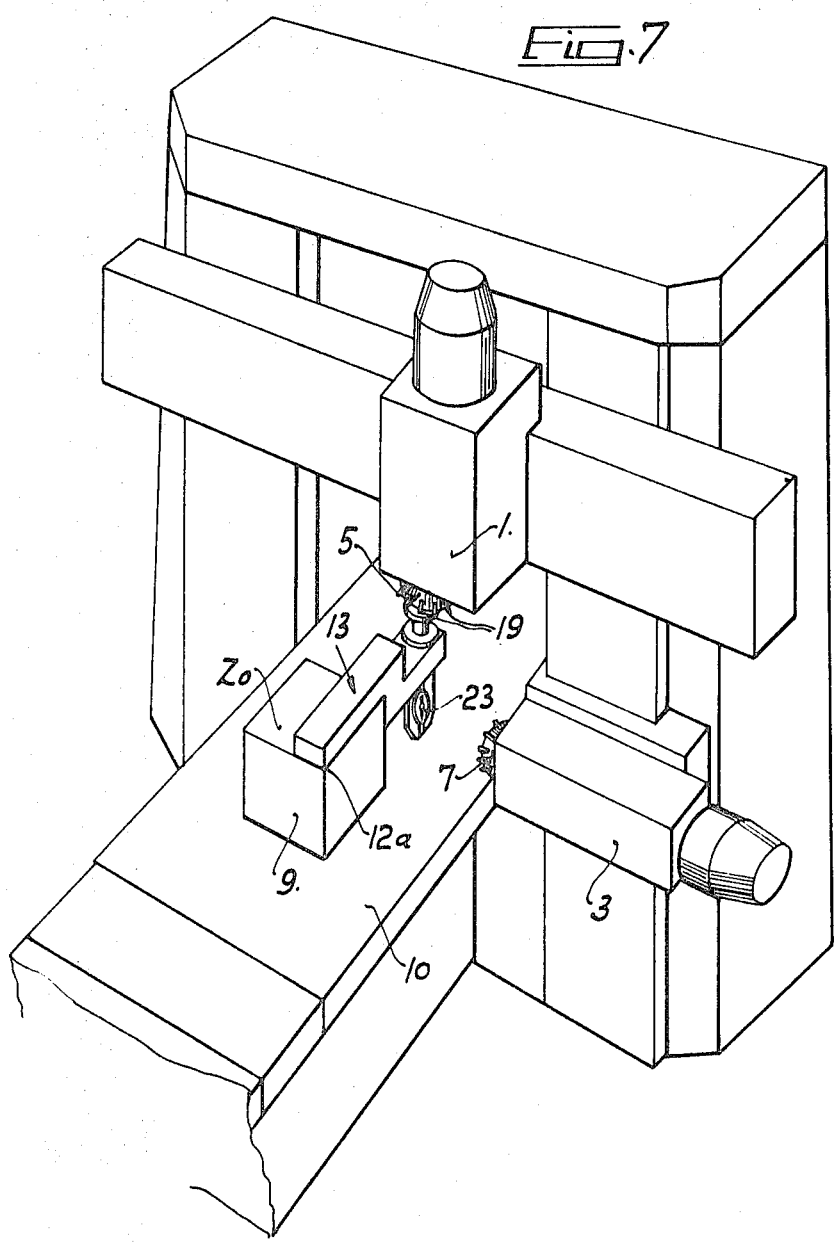

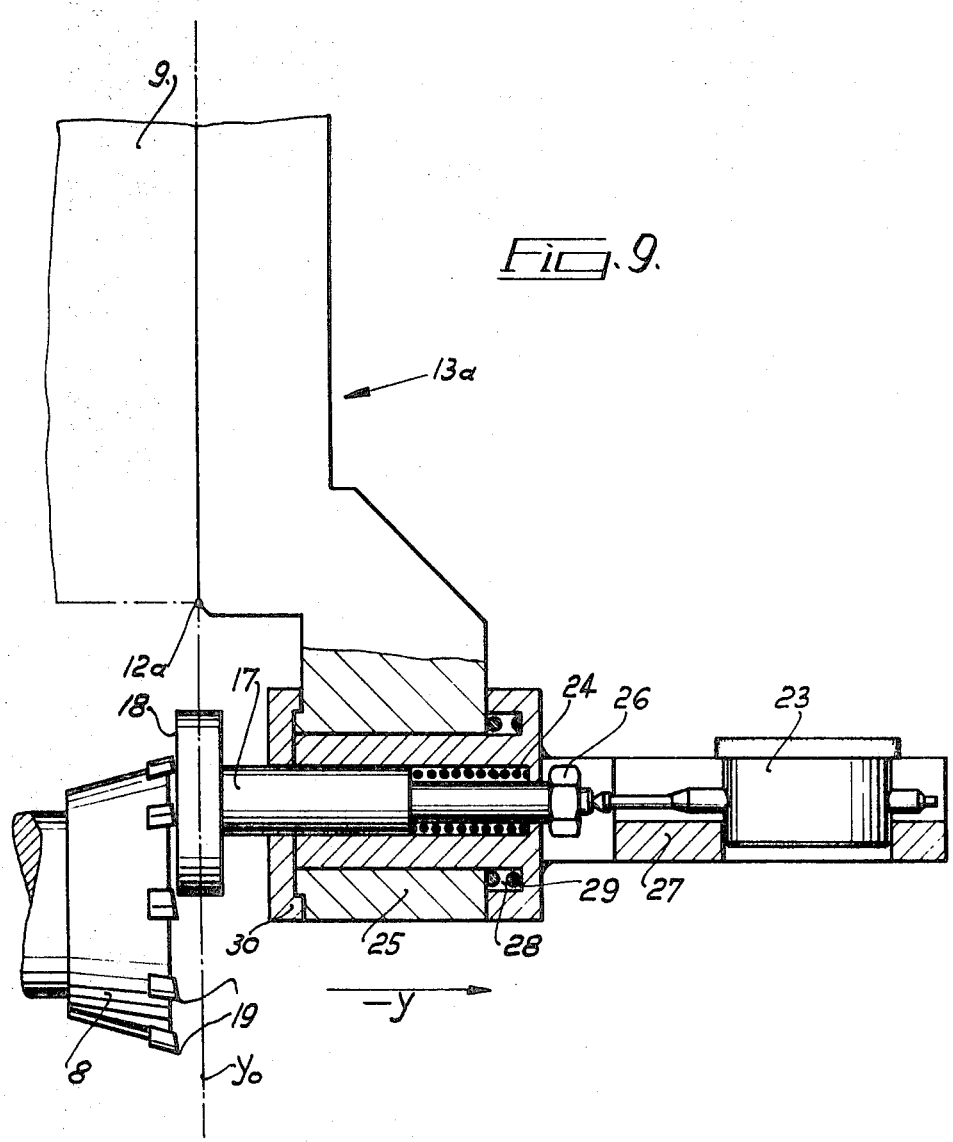

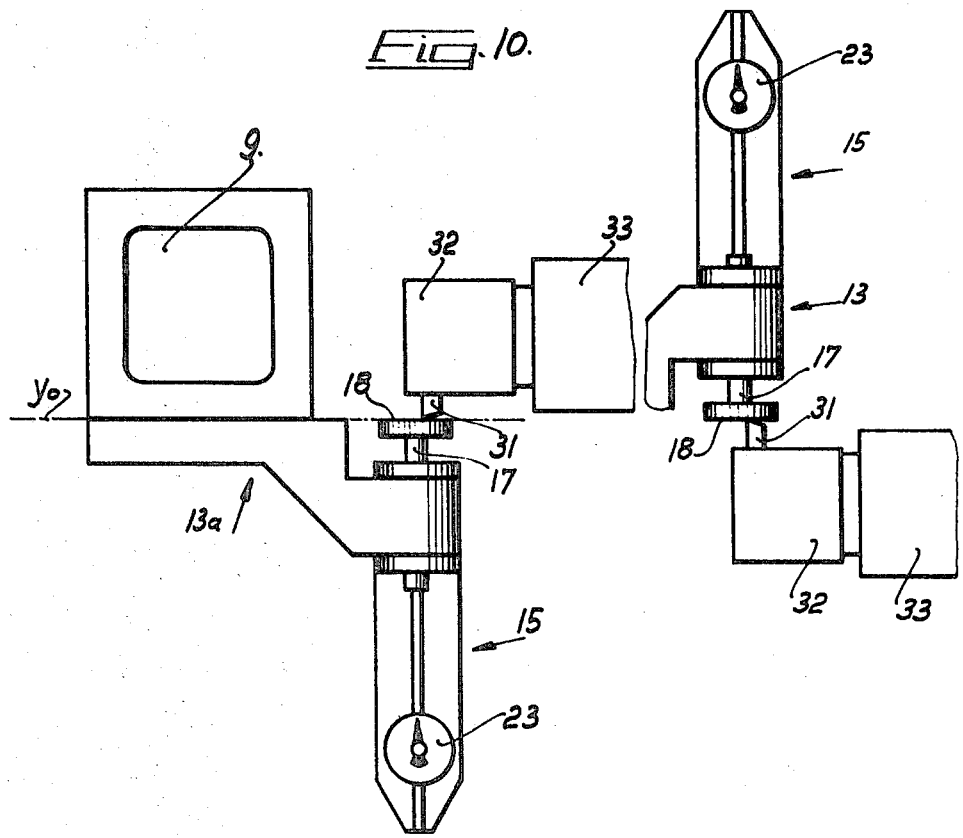

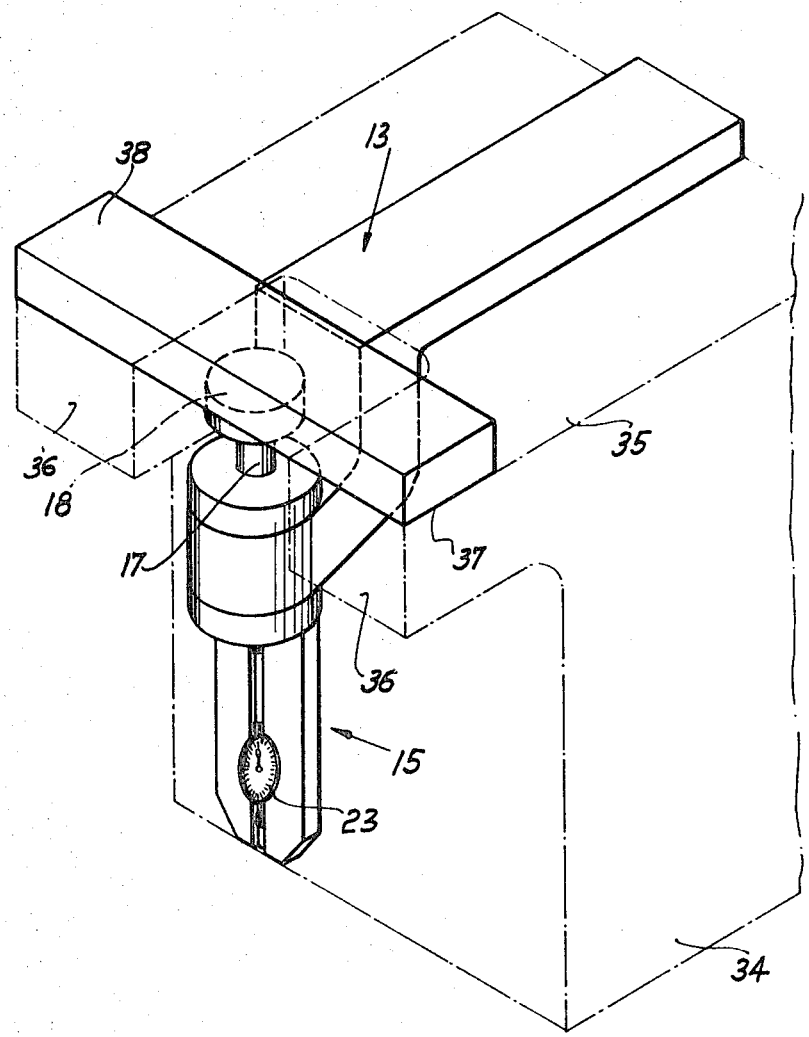

United States Patent Office 3,614,909
Patented Oct. 26, 1971

3,614,909
APPARATUS FOR ADJUSTING CUTTING TOOLS FOR THEIR USE IN TOOL MACHINES, IN PARTICULAR MILLING MACHINES
Rolf-Dieter Neuser, Coburg, Bavaria, Germany, assignor to Werkzeugmaschinenfabrik Adolf Waldrich Coburg, Coburg, Bavaria, Germany
Filed Mar. 4, 1969, Ser. No. 804,236
Claims priority, application Germany, Mar. 15, 1968,
P 16 52 751.8
Int. Cl. B27g 23/00
U.S. Cl. 90—11 R                                    10 Claims

ABSTRACT OF THE DISCLOSURE

An apparatus for adjusting the infeed of cutting tools in tool machines, in particular milling machines. There is provided on the machine table or on a workpiece clamped on the machine table a zero point of a three-dimensional coordinate system. The tool cutting edge is thereafter brought into one of the reference planes defined by the coordinate axes by means of a measuring and indicating device. The measurement readable on the scale associated with the tool support is determined as a zero value and the infeed of the tool toward the workpiece is then carried out according to this scale.

---

This invention relates to an apparatus for adjusting the infeed of cutting tools in tool machines, in particular milling machines.

In modern milling machines, indicating devices are provided for the infeed of cutting tools or milling cutters and their tool supports. These indicating devices consist of scales which, as the rule, are arranged on the stationary machine part in axial direction and of reading apparatus which are arranged on the movable machine part, for example, the tool supports, and usually record optically electronically or electrically inductively. The signals of the respective reading apparatuses are then reinforced and fed to a counter on which the respective positions of the tool support can be read numerically. Such counters are provided with zero position devices so that each desired position of the tool support relative to the movable part, for example, the machine table, can be referenced to the zero position and infeeds of the tool to the workpiece can take place starting at the zero value. However, the exact position of the cutting edges of the tool are not sensed by this apparatus and these can change with respect to the tool support due to use, finish grinding or exchange of tools. However, in effectively measured cutting, it is essential that the position of the cutting edges of the tool and not the position of the tool support to the workpiece be accurately controlled.

One method for adjusting of cutting tools is already known in which the respective cutting edges are adjusted in an optical path in reference to a cross web and their position is sensed in the measuring device.

Furthermore, feeler gauges for single tool cutting edges are known which are applied to a receiver on the tool support and permit an adjustment of the tool.

However, it must be pointed out that with the known methods only those tools can be adjusted which have a single cutting edge engaging the workpiece. Tools having several cutting edges, for example, milling cutters, are controllable, for example, by the optical path method only by using complicated deflections and relative movements of the object glass.

Thus, the basic purpose of the invention is to produce an apparatus to adjust the infeed of cutting tools in tool machines, in particular milling machines, which permits with a relatively little work a very exact adjustment of cutting tools even though same are provided with a plurality of cutting edges.

To attain this purpose, the invention provides that on the machine table, or on a workpiece which is clamped on the machine table, there is set the zero point of a three-dimensional coordinate system and the tool cutting edge is thereafter brought into one of the reference planes defined by the coordinate axes by means of a measuring and indicating device, the measurement readable on the scale associated with the tool support is determined as zero value and finally the infeed of the tool to the workpiece is carried out according to this scale.

The apparatus of the invention has the advantage that with its help it becomes possible to control accurately the position, in particular tools with multi-cutting edges like milling cutters, with reference to a three-dimensional coordinate initial point, namely, the zero point of a three-dimensional coordinate system.

Furthermore, the subject matter of the invention includes apparatus which is characterized (a) in a gauge which is clamped on the machine table or on the workpiece to be treated and has at least three outer surfaces which are arranged rectangularly to one another and form the reference planes of the three-dimensional coordinate system, (b) in at least one clamp with a planar stop face with which it can butt at one of the outer surfaces of the gauge, and (c) in a measuring and indicating device arranged on the clamp for measuring and indicating the position of the cutting edges of the tool with respect to the respective outer surface or reference plane of the gauge, whereby in a known manner at least one scale for the movement of the tool or its support is provided on the machine frame. The apparatus according to the invention has the advantage that it is very convenient to use and that it reduces long standstill times which otherwise occur for measuring and adjusting the tool cutting edges and which particularly strongly influence the economy of tool machines which have a high level of output and automatic control, like milling machines.

The invention and its further advantageous developments will be discussed more in detail hereinafter in connection with an exemplary embodiment of an apparatus for performing the method of the invention, which embodiment is illustrated in the drawings in which:

FIG. 3 is a clamp of the invention with a measuring and indicating device in abutment with the outer surface of the gauge which outer surface illustrates the y-plane, whereby a milling cutter intended for movement in the positive y-direction is arranged in abutment with the measuring and indicating device and is arranged with its cutters in the $y_0$-plane;

FIG. 4 illustrates a corresponding arrangement with a milling cutter moved into the $y_0$-plane and provided for the movement in the negative y-direction whereby a correspondingly constructed second clamp is being used;

FIG. 5 is a schematic and partial view of the milling machine according to FIG. 1, in which, corresponding to FIG. 3, the adjustment of a milling cutter takes place in the $y_0$-plane;

FIG. 6 is the adjustment of a milling cutter in the $z_0$-plane, which milling cutter is provided for movement in the z-direction;

FIG. 7 is a schematic and partial view of a milling machine in which an adjustment of the milling cutter which is intended for movement in the z-direction takes takes place according to FIG. 6;

FIG. 9 is a further clamp according to the invention and a measuring and indicating device which is suitable for the adjustment of a work tool which acts in the opposite axial direction;

FIG. 10 illustrates the use of the apparatus of the invention to determine the exact operating diameter of a boring tool;

FIG. 11 illustrates a calibrating equipment to calibrate the clamp and the measuring and indicating device according to FIG. 8.

Figure 1:
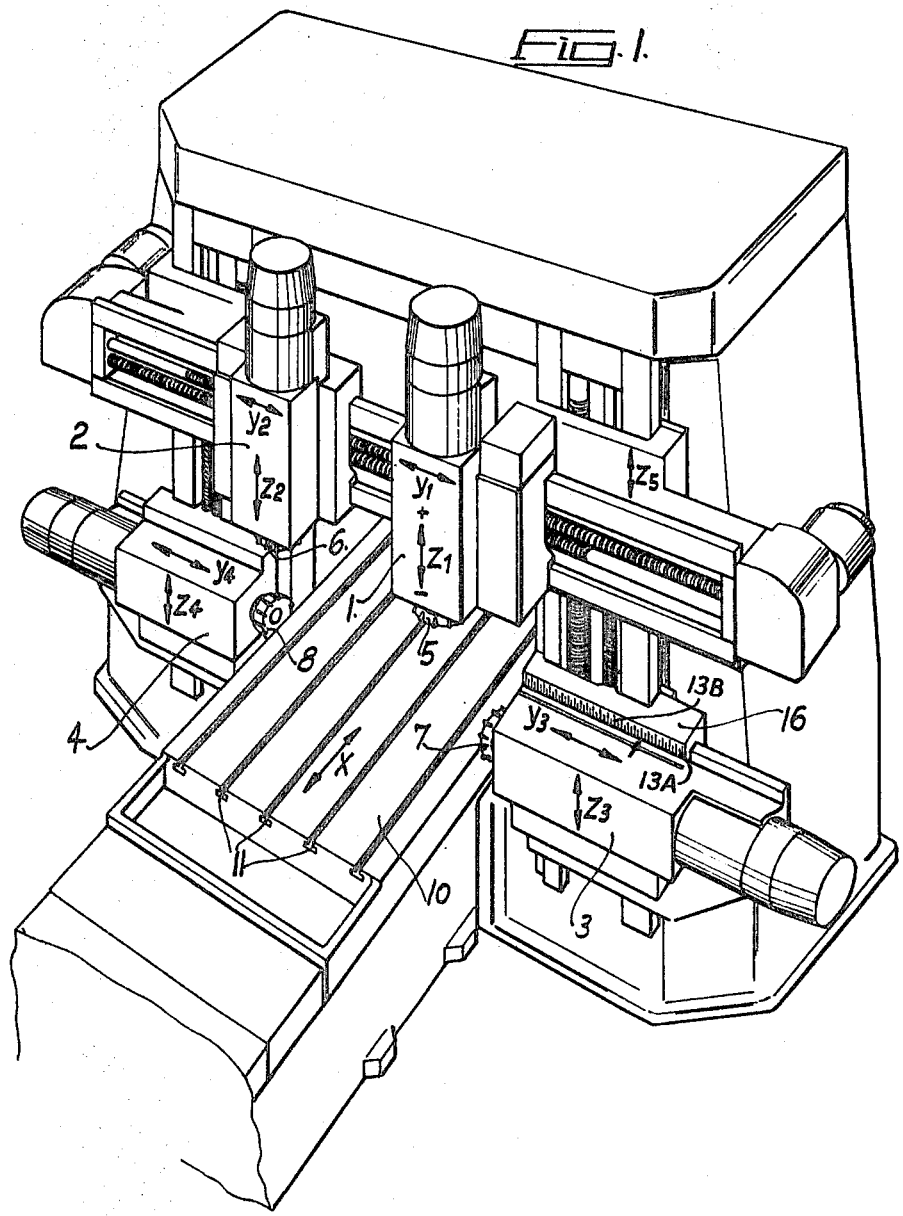
FIG. 1 is a planar-type milling machine, the work tools or cutters of which can be adjusted by means of the apparatus of the invention.
Figure 2:
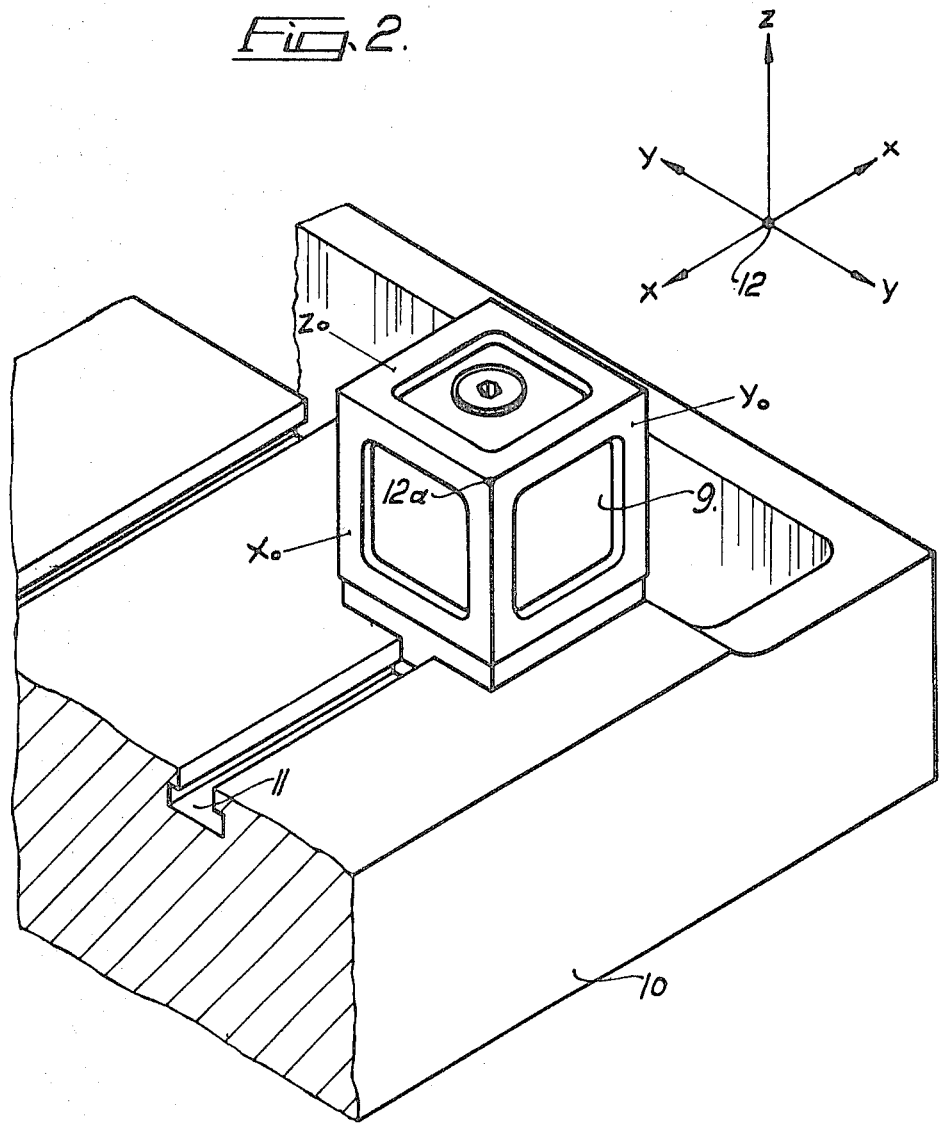
FIG. 2 is, in an enlarged scale, a measuring member and its exemplary arrangement on the machine table of the milling machine.

FIG. 1 illustrates as an example a milling machine, the milling cutters of which are advantageously adjustable by means of the corresponding apparatus of the invention. The milling machine is provided with four work tool supports 1, 2, 3 and 4, all of which are movable in two directions which are positioned perpendicularly to each other. A movement which occurs transversely to the machine table 10 is thereby identified with y, and a movement which occurs vertically to the machine table is identified with z. The numerals 1–4 characterize the association of each arrow with the respective tool supports 1–4. The tools or milling cutters are identified with 5, 6, 7 and 8. A gauge 9 (FIG. 2) is provided according to the invention for adjusting the milling cutters or their cutting edges, said gauge 9 being clamped on the machine table 10 and comprsing at least three outer surfaces which are arranged at right angles to one another and which form the reference planes $x_0$, $y_0$, $z_0$ of a three-dimensional coordinate system $x, y, z$. Advantageously, said gauge 9 is a cube as is illustrated in FIG. 2. Said gauge 9 is advantageously clamped in one of the T-grooves 11 of the machine table 10, which latter is movable in the x-direction. The gauge 9 can, however, also be clamped on a workpiece which is not illustrated through which the reference planes $x_0$, $y_0$ and $z_0$ are placed closer to the workpiece. The zero point 12 of the coordinate system illustrated separately in FIG. 2 is provided by the corner point 12a of the gauge 9 in the illustrated embodiment. Of course, the other corner points of the gauge can also form the zero point of a coordinate system.

Furthermore, according to the invention, as illustrated in FIG. 3, at least one clamp 13 with a planar stop face 14 is provided, which planar stop face can butt one of the outer surfaces of the gauge 9. The stop face 14 of the clamp 13 is, in the illustrated arrangement, butting at the outer surface of the gauge 9, which outer surface is the reference plane $y_0$. Further, according to the invention, a measuring and indicating device 15 for measuring and indicating the position of the tool cutting edges of the milling cutter 7 with respect to the reference plane $y_0$ of the gauge is provided on the clamp 13. Finally, a scale 13A for the movement of the tool or the milling cutter 7 or its support 3 is provided in an actually known manner on the machine frame 16 (FIG. 1). As soon as the milling cutter 7 is in the position illustrated in FIG. 3, that is, in the $y_0$-plane, this position is set as the zero value 13B on the scale. The infeed movement relative to the workpieces, which workpiece is not illustrated but which is arranged on the machine table 10 in the direction of the y-axis, starts thereafter from said zero value 13B whereby, in the arrangement illustrated in FIG. 3, the infeed movement occurs in the y-direction.

Figure 8A:
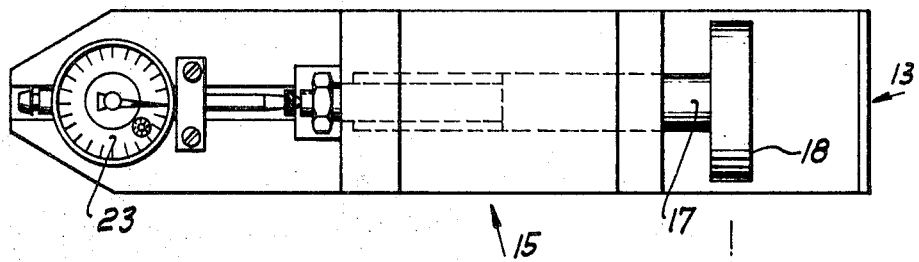
FIG. 8a is a side-elevational view in the direction of arrow A in FIG. 8.
Figure 8:
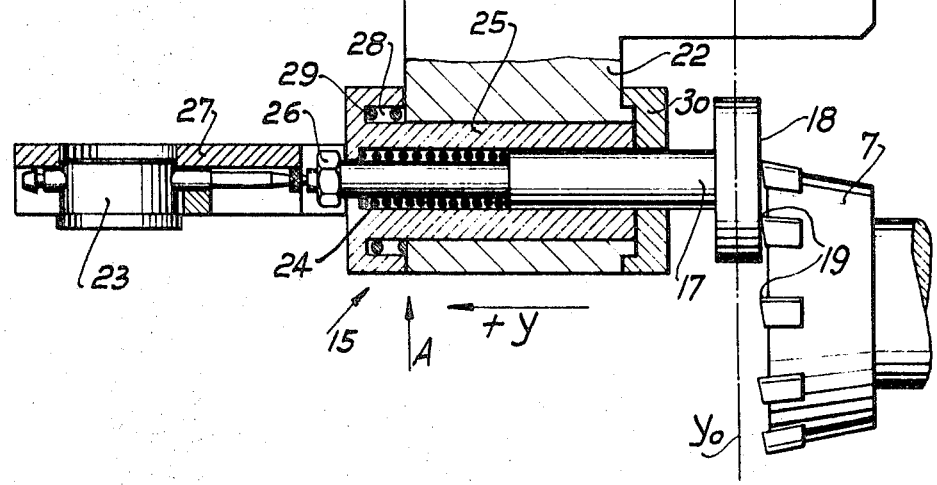
FIG. 8 is, in cross section and on an enlarged scale, a clamp with a measuring and indicating device according to the invention in abutment with a gauge according to FIG. 3.

The measuring and indicating device in the illustrated embodiment has a pressure foot 17 with a feeler surface 18, said pressure foot 17 being movably supported against a spring pressure perpendicularly to the stop face 14 of the clamp 13 and said feeler surface 18 being arranged parallel to the stop face 14 of the clamp 13 and, during the adjustment of the tool or milling cutter 7, abutting the cutting edge or cutting edges 9 of said tool. This is particularly clearly illustrated in FIG. 8. As is illustrated, the clamp 13 consists advantageously of an offset rod. The stop surface 14 is provided on the rod end 21 which is provided on the one side of the shoulder 20 and the pressure foot 17 having the feeler surface 18 is mounted on the other rod end 22. The pressure foot 17 projects laterally over the gauge or cube when the clamp 13 abuts the gauge 18. In the illustrated embodiment, the pressure foot 17 cooperates with a dial gauge 23 for indicating the movement of the pressure foot 17 and the feeler surface 18 perpendicular to the stop face of the gauge 9 when the clamp 13 is in the abutting condition; in the case illustrated in FIG. 8, again the reference plane $y_0$ corresponding to the arrangement illustrated in FIG. 3. In the position of the milling cutter 7 illustrated in FIG. 8, the cutting edges 19 of said milling cutter are not yet in the reference plane $y_0$. However, as soon as the feeler surface 18 of the pressure foot 17 and indicating device 15, after further adjusting the milling cutter 7, is in the reference plane $y_0$ illustrated by the outer surface of the gauge 9, the dial gauge 23 shows a zero position. The dial gauge is particularly clearly illustrated in FIG. 8a. As has already been discussed, the pressure foot 17 is movable against a spring force; the spring is identified with reference numeral 24 in FIG. 8.

The measuring and indicating device 15 of the dial gauge 23 is advantageously rotatably supported on the clamp 13 so that a good reading is assured at any time. In the illustrated embodiment, the pressure foot 17 is guided, to achieve minimum friction, for longitudinal movement within a flanged sleeve 25. The aforementioned spring 24 biases the pressure foot and the feeler surface 18 toward the millng cutter 7. A nut 26 or the like limits the movement of the pressure foot 17. The flanged sleeve 25 carries a plate 27 which is rigidly connected to said flanged sleeve and which holds the dial gauge and is advantageously constructed so that it secures the dial gauge against impacts.

The flanged sleeve 25 has a bore 28 in which a pressure spring 29 is provided between the flanged sleeve 25 and the clamp 13. Thus, the mentioned possibility of adjusting or rotating the dial gauge for the purpose of better readability is not only assured, but it also results in a position which is favorable for reading changes at random. Furthermore, in the illustrated embodiment, there is provided a flange ring 30 which is connected to the flanged sleeve 25 and which fixes the flanged sleeve axially relative to the clamp 13. At least one permanent magnet 31 is advantageously provided on the clamp 13 flush with the stop face 14. Said permanent magnet or said permanent magnets prevent a sliding off of the clamp 13 after said clamp has abutted the gauge 9.

It should be pointed out that the measuring and indication does not necessarily need to be done mechanically by means of a dial gauge, as has been described, but that optical, electrical or the like measuring devices could also be provided.

FIG. 5 illustrates the milling machine according to FIG. 1 in a simplified form whereby the adjustment of the milling cutter 7 in the direction of the positive y-axis, as illustrated in FIGS. 3 and 8, is again clearly illustrated. The reference plane $y_0$ is thereby indicated in a shaded area. The clamp 13 which is used and has already been described is constructed in such a manner that the feeler surface 18 of the pressure foot 17 and the stop face 14 are each arranged on opposite sides of the clamp 13. It is possible with this arrangement, as has been shown, to adjust the milling cutter 7 of the tool support 3 or to move its cutting edges 19 into the reference plane $y_0$; however, the cutting edges of the milling cutter 8 of the work tool support 4 (FIG. 1) cannot be so adjusted. Accordingly, it is necessary, as can be seen from FIG. 4 and in particular FIG. 9, to arrange the stop face 14 of the clamp 13a and the feeler surface 18 of the pressure foot on the same side of the clamp 13a since the milling tool 8 is fed or moved in the direction of the negative y-axis relative to the workpiece (not illustrated). The further characteristics of the clamp 13a and the measuring and indicating device are the same as those of the clamp 13 which has been described in detail above.

The adjustment of the milling cutter 5 of the tool carrier 1 (FIG. 1) relative to the z-axis is done in a corresponding manner as illustrated in FIGS. 6 and 7. In this case, a clamp 13 in addition to the measuring and indicating device 15 is placed with its stop face 14 into the outer surface of the gauge 9, which outer surface is the reference plane $z_0$. The cutting edges of the milling cutter 5 of the tool support 1 are thereafter moved vertically downwardly until the cutting edges abut the feeler surface 18 of the pressure foot 17. The milling cutter 5 is then moved against the pressure of the spring 24 (compare FIG. 8) in the same direction (z-direction) until its cutting edges 19 (FIG. 7) are in the $z_0$-plane, that is, until the dial gauge 23 shows zero. This value is thereafter set as the zero value on the associated indicating device (not illustrated of the work tool support 1, after which, of course, after the clamp 13 has been removed, movement can occur in the z-direction toward the workpiece (not illustrated).

As can be seen, in a very simple manner and without a great operation, there can be achieved an exact adjustment of the milling cutters 5, 6, 7 and 8 of the milling machine illustrated in FIG. 1 with the goal of producing an extremely exactly measured workpiece.

Furthermore, the apparatus can also be advantageously used to exactly determine the working diameter a boring tool. In reference to this, FIG. 10 will be utilized. In this figure, a drill bit is arranged on a boring head of a spindle 33. To find the working diameter of the drill bit 31, first the clamp 13a abuts the gauge 9. If the drill bit 31 is in its extreme position and is also in abutment with the feeler surface 18 of the pressure foot 18 whereby the dial gauge 23 indicates the zero position, the cutting point of the drill bit 31 is in the corresponding refrence plane of the gauge 9. The indicating device which is not illustrated is then set on zero for movement of the spindle 33 perpendicular to the respective reference plane, for example, the plane $y_0$.

The spindle 33 is thereafter, as illustrated in FIG. 10, adjusted downwardly and the clamp 13a is replaced with a clamp 13 as indicated on the right side in FIG. 10. The drill bit 31 is rotated 180 degrees by means of the boring head 32 into contact with the feeler surface 18 of the pressure foot 17 of the measuring and indicating device 15 of the clamp 13 and finally moves so far that again zero is being indicated. The movement of the drill bit 31 and the boring head 32 and spindle 33 or spindle support from the zero position determined during the first measuring to the measured value of the indicating device during the second measuring is identical with the working diameter which is described by the drill bit 31 or the respective boring tool with its cutting edge point.

Finally, according to the invention, a calibrating device is provided for adjusting the dial gauge 23 which consists of a calibrating member 34 (FIG. 11) having a planar support surface 35 for abutting the clamp 13 and lateral, fork-shaped projections 36, the upper surfaces of which are arranged in the plane with the support surface 35. The pressure foot 17 with its feeler surface 18 is arranged between said projections 36 during the calibration process. Furthermore, the calibrating device consists according to the invention of a stop piece 38 which is provided with a planar surface 37 and placeable on the feeler surface 18 of the pressure foot 17 projecting upwardly between the projections 36. Said stop piece 38, when being placed on the feeler surface, presses the feeler surface 18 of the pressure foot 17 into the plane of the support surface 35 of the calibrating member 34 whereafter the dial gauge 23 can be set to zero.

An equivalent constructed calibrating device is being provided for calibrating the pressure foot 17 or the dial gauge 23 of the clamp 13a. The described method and apparatus can, if angle cutter heads are used, also be used for the adjustments in the x-direction given in FIG. 1.

The embodiments of the invention in which an exclusive property or privilege is claimed are defined as follows:

1. Apparatus for use in adjusting the cutting plane in a milling machine having a tool and a tool holder movable relative to a table, comprising:
   gauge means mounted in fixed relation to said table, said gauge means having at least three mutually adjacent mutually perpendicular surfaces defining three reference planes in a three-dimensional coordinate system;
   a clamp member having a planar stop face thereon, said stop face being parallel to and engaged with one of said mutually perpendicular surfaces on said gauge means;
   a measuring and indicating device mounted on said clamp member, said measuring and indicating device having a tool engaging portion supported for movement relative to said clamp member through a position coplanar with said one of said mutually perpendicular surfaces, said tool engaging portion being arranged to engage said tool, said measuring and indicating device including measuring means responsive to a relative movement between said tool engaging portion engaged by said tool and said table and indicating means indicating the position of said tool relative to said one of said mutually perpendicular surfaces; and
   a scale on said tool machine adjusted to indicate the relative position of said tool holder and tool relative to said one of said mutually perpendicular surfaces after said gauge means, said clamp member and said measuring and indicating device have been removed from said milling machine.

2. Apparatus according to claim 1, wherein the gauge means is a cube.

3. Apparatus according to claim 1, wherein the tool engaging portion of the measuring and indicating device has a pressure foot with a feeler surface, said pressure foot being movably supported against spring pressure perpendicularly to the stop face of the clamp, and the feeler surface is arranged parallel to the stop face of the clamp member and during adjustment of the tool is in abutment with the cutting edge of said tool.

4. Apparatus according to claim 3, wherein the clamp member includes an offset rod and on one end is provided with the stop face, and on the other rod end there is provided the feeler surface of the pressure foot in such a manner that when the clamp abuts against the gauge means, the pressure foot projects laterally over the gauge means.

5. Apparatus according to claim 4, wherein the stop surface of the clamp member and the feeler surface of the pressure foot are arranged on opposite sides of the clamp member.

6. Apparatus according to claim 4, wherein the stop face of the clamp member and the feeler surface of the pressure foot are arrangfed on the same side of the clamp member.

7. Apparatus according to claim 3, wherein the indicating means is a dial gauge and the pressure foot cooperates with said dial gauge for indicating the movement of the pressure foot and feeler surface perpendicular to the stop face of the clamp member and the respective outer surface of the gauge means abutting the clamp member, whereby a zero position is indicated as soon as the feeler surface of the pressure foot, during adjustment of the tool, is in the reference plane represented by the outer surface of the gauge means.

8. Apparatus according to claim 7, wherein a calibrating device for adjusting the dial gauge is provided, said calibrating device comprising a calibrating member having a planar support surface for abutting the clamp member and lateral fork-shaped projections, the upper surface of which is arranged in a plane with the support surface and between which, during the calibration process, the pressure foot is arranged, and further comprising a stop piece which is provided with a planar surface and is placeable on the feeler surface of the pressure foot projecting upwardly between the projections, said stop piece being placeable on the feeler surface for moving same into the plane of the support surface whereafter the dial gauge can be set to zero.

9. Apparatus according to claim 1, wherein at least one permanent magnet is provided on the clamp member flush with the stop face.

10. Apparatus according to claim 7, wherein the dial gauge is rotatably arranged opposite the clamp member.

References Cited

UNITED STATES PATENTS

| | | | |
|---|---|---|---|
| 2,782,520 | 2/1957 | Amend | 33—185 |
| 2,891,317 | 6/1959 | Wood | 33—185 |
| 3,167,868 | 2/1965 | Arneson | 33—185 |
| 3,481,247 | 12/1969 | Hayes | 33—185 |

GIL WEIDENFELD, Primary Examiner

U.S. Cl. X.R.

33—185; 77—1